(12) United States Patent
Ishizaka et al.

(10) Patent No.: US 11,149,848 B2
(45) Date of Patent: Oct. 19, 2021

(54) AUTOMATIC TRANSMISSION

(71) Applicant: Mazda Motor Corporation, Hiroshima (JP)

(72) Inventors: Tomotaka Ishizaka, Aki-gun (JP); Norio Iwashita, Aki-gun (JP); Shota Yamakawa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/028,052

(22) Filed: Sep. 22, 2020

(65) Prior Publication Data

US 2021/0116025 A1    Apr. 22, 2021

(30) Foreign Application Priority Data

Oct. 16, 2019    (JP) .............................. JP2019-189636

(51) Int. Cl.
| | |
|---|---|
| *F16H 57/10* | (2006.01) |
| *F16H 63/30* | (2006.01) |
| *F16H 57/04* | (2010.01) |

(52) U.S. Cl.
CPC ....... *F16H 63/3026* (2013.01); *F16H 57/043* (2013.01); *F16H 57/0473* (2013.01); (Continued)

(58) Field of Classification Search
CPC ............. F16H 57/0484; F16H 57/0473; F16H 57/043; F16H 57/10; F16D 25/0638; F16D 13/69
See application file for complete search history.

(56) References Cited

U.S. PATENT DOCUMENTS

| | | |
|---|---|---|
| 10,774,924 B2 | 9/2020 | Yamakawa et al. |
| 2003/0224899 A1 | 12/2003 | Ishimaru et al. |

(Continued)

FOREIGN PATENT DOCUMENTS

| | | |
|---|---|---|
| JP | 2016090048 A | 5/2016 |
| JP | 2017150533 A | 8/2017 |

OTHER PUBLICATIONS

European Patent Office, Extended European Search Report Issued in Application No. 19215385.6, dated May 26, 2020, Germany, 7 pages.

*Primary Examiner* — Ernesto A Suarez
*Assistant Examiner* — Lillian T Nguyen
(74) *Attorney, Agent, or Firm* — Alleman Hall Creasman & Tuttle LLP

(57) ABSTRACT

An automatic transmission with a brake is provided, the brake including a hub member coupled to a transmission case. The hub member includes a first hub member having a cylindrical part spline-engaged with friction plates and the transmission case, and forming a disengagement hydraulic chamber, a second hub member disposed at one side of the first hub member in the axial direction, fitted into the transmission case, and coupled to the one side of the first hub member in the axial direction by a first coupling member, and a third hub member disposed at the other side of the first hub member in the axial direction, coupled to the other side of the first hub member in the axial direction by a second coupling member, and forming an engagement hydraulic chamber. The first coupling member and the second coupling member are disposed radially inward of the disengagement hydraulic chamber.

7 Claims, 9 Drawing Sheets

(52) U.S. Cl.
CPC ....... *F16H 57/10* (2013.01); *F16H 2200/006* (2013.01); *F16H 2200/0082* (2013.01); *F16H 2200/2043* (2013.01)

(56) References Cited

U.S. PATENT DOCUMENTS

| | | | |
|---|---|---|---|
| 2004/0154894 | A1 | 8/2004 | Braford, Jr. et al. |
| 2014/0090944 | A1 | 4/2014 | Goleski et al. |
| 2016/0281807 | A1* | 9/2016 | Kaufman ............... F16D 65/853 |
| 2017/0009831 | A1* | 1/2017 | Iwasaki .................. F16H 57/10 |
| 2017/0241546 | A1 | 8/2017 | Sasahara et al. |
| 2017/0276235 | A1 | 9/2017 | Iwasaki et al. |
| 2018/0274600 | A1* | 9/2018 | Fukuda .................. F16D 48/02 |
| 2018/0340605 | A1* | 11/2018 | Nishioka ................. B60T 1/062 |
| 2021/0048103 | A1* | 2/2021 | Sasaki ...................... F16H 3/66 |
| 2021/0116025 | A1 | 4/2021 | Ishizaka et al. |

* cited by examiner

|  | CL1 | CL2 | CL3 | BR1 | BR2 |
|---|---|---|---|---|---|
| 1ST GEAR | O |  |  | O | O |
| 2ND GEAR |  | O |  | O | O |
| 3RD GEAR | O | O |  |  | O |
| 4TH GEAR |  | O | O |  | O |
| 5TH GEAR | O |  | O |  | O |
| 6TH GEAR | O | O | O |  |  |
| 7TH GEAR | O |  | O | O |  |
| 8TH GEAR |  | O | O | O |  |
| REVERSE GEAR |  |  | O | O | O |

FIG. 2

AUTOMATIC TRANSMISSION

TECHNICAL FIELD

The present disclosure relates to an automatic transmission mounted on a vehicle, and particularly belongs to a technical field of an automatic transmission for a vehicle.

BACKGROUND OF THE DISCLOSURE

It is generally known that automatic transmissions mounted on vehicles each include a hydraulic power transmission device, such as a torque converter, coupled to a drive-source, such as an engine, and a transmission mechanism having a plurality of planetary gear sets (planetary gear mechanisms) and a plurality of friction engagement elements including clutches and brakes. The automatic transmission selectively engages the plurality of friction engagement elements by using a hydraulic control to achieve a plurality of gear stages with different gear ratios.

In recent years, there are demands for an increase in the number of gear stages and a reduction in the weight of the automatic transmission. In order to achieve these, eliminating the hydraulic power transmission device is considered, and by performing a slip control of a brake which is engaged at a first gear stage during the start of a vehicle, a smooth start of the vehicle is realized while avoiding an engine stall. Since the slip control of the brake is frequently performed, it is required to effectively reduce heat generation of friction plates caused by the slip control.

It can be considered to improve the cooling performance by increasing an amount of hydraulic oil for lubrication supplied to the friction plates. However, in the brake where a plurality of friction plates are disposed between an inner circumferential surface of a transmission case and an outer circumferential surface of a given rotating member accommodated in the transmission case, the hydraulic oil for lubrication may stagnate in the vicinity of the inner circumferential surface of the transmission case, which may increase a rotational resistance.

For example, JP2016-090048A discloses a brake which is engaged at the first gear stage and is slip-controlled when a vehicle starts. The brake includes a plurality of friction plates disposed between an outer circumferential surface of a hub member coupled to a transmission case and an inner circumferential surface of a drum member coupled to a given rotating member.

The brake disclosed in JP2016-090048A intends to cool the friction plates by supplying hydraulic oil for lubrication thereto from the hub member side, while reducing stagnation of the hydraulic oil by moving the hydraulic oil, which is moved to the drum member side by a centrifugal force of the friction plates, outward of the drum member by the rotation of the drum member.

In the automatic transmission configured to slip-control the brake which is engaged at the first gear stage during the start of the vehicle, the plurality of friction plates may be disposed between the outer circumferential surface of the hub member coupled to the transmission case and the inner circumferential surface of the drum member coupled to the given rotating member. An engagement hydraulic chamber and a disengagement hydraulic chamber of a piston which engages the plurality of friction plates may be disposed radially inward of the plurality of friction plates to downsize the automatic transmission.

Moreover, the hub member coupled to the transmission case may be comprised of a first hub member which has a cylindrical part to which the friction plates are spline-engaged and is spline-engaged with the transmission case, and a second hub member which is fitted into the transmission case so as to be disposed on one side of the first hub member in the axial direction and connected to a valve body. The first hub member may stop the rotation of the hub member during the engagement of the brake, and the second hub member may supply the hydraulic oil for lubrication from the valve body to the hub member side so as to efficiently supply the hydraulic oil to the friction plates.

FIG. 9 is a cross-sectional view illustrating a brake of a conventional automatic transmission. In a brake 200 illustrated in FIG. 9, a plurality of friction plates 205 are disposed between an outer circumferential surface of a hub member 202 coupled to a transmission case 201 and an inner circumferential surface of a drum member 204 coupled to a given rotating member 203. An engagement hydraulic chamber 207 and a disengagement hydraulic chamber 208 for a piston 206 which engages the plurality of the friction plates 205 are disposed radially inward of the plurality of friction plates 205.

The hub member 202 is comprised of a first hub member 210 and a second hub member 211. The first hub member 210 has a cylindrical part 209 to which the friction plates 205 are spline-engaged, is spline-engaged with the transmission case 201, and forms the disengagement hydraulic chamber 208. The second hub member 211 is fitted into the transmission case 201 so as to be disposed on one side of the first hub member 210 in its axial direction and connected to the valve body.

The first hub member 210 includes an outer hub member 210a and an inner hub member 210b, and the disengagement hydraulic chamber 208 is formed in the inner hub member 210b. The hub member 202 is also comprised of a third hub member 212 disposed on the other side of the first hub member 210 in the axial direction and forming the engagement hydraulic chamber 207.

The hub member 202 is integrally constructed by coupling the first hub member 210 to the second hub member 211 by using a plurality of first coupling members 213 disposed on the same circumference, and coupling the second hub member 211 to the third hub member 212 by using a plurality of second coupling members 214 disposed on the same circumference.

However, in the brake 200, the first and second coupling members 213 and 214 are disposed at radially different positions, and the disengagement hydraulic chamber 208 is disposed between the first and second coupling members 213 and 214 in the radial direction. Therefore, a radial spacing D between the first and second coupling members 213 and 214 is large.

Accordingly, when hydraulic oil is supplied to the engagement hydraulic chamber 207 to move the piston 206 in an engaging direction, the first hub member 210 may be applied with a force F1 to one side in the axial direction through the first coupling members 213, and a force F2 to the other side in the axial direction through the second coupling members 214. Therefore, a deformation may occur between the first and second coupling members 213 and 214 in the radial direction. Particularly, when dented parts 215 and 216 are formed between the first and second coupling members 213 and 214 in the radial direction, the deformation may occur in the dented parts 215 and 216 which serve as stress concentrating parts.

If the first hub member 210 of the hub member 202 deforms during the engagement of the brake 200, the positioning accuracy of the piston 206 may be reduced and the hydraulic oil may be leaked, which may lead to a malfunction of the brake 200. Therefore, it is desired to reduce the deformation of the hub member 202 during the engagement of the brake 200.

SUMMARY OF THE DISCLOSURE

One purpose of the present disclosure is to provide an automatic transmission with a brake having a hub member coupled to a transmission case, which reduces deformation of the hub member during engagement of the brake.

According to one aspect of the present disclosure, an automatic transmission with a brake is provided. The brake includes a hub member coupled to a transmission case, a drum member coupled to a given rotating member, a plurality of friction plates disposed between the hub member and the drum member, a piston configured to engage the plurality of friction plates, an engagement hydraulic chamber to which hydraulic fluid is supplied to bias the piston in an engaging direction, and a disengagement hydraulic chamber to which hydraulic fluid is supplied to bias the piston in a disengaging direction. The piston extends radially inward of the plurality of friction plates. The engagement hydraulic chamber and the disengagement hydraulic chamber are disposed radially inward of the plurality of friction plates. The hub member includes a first hub member having a cylindrical part spline-engaged with the friction plates, spline-engaged with the transmission case, and forming the disengagement hydraulic chamber, a second hub member disposed at one side of the first hub member in the axial direction, fitted into the transmission case, and coupled to the one side of the first hub member in the axial direction by a first coupling member, and a third hub member disposed at the other side of the first hub member in the axial direction, coupled to the other side of the first hub member in the axial direction by a second coupling member, and forming the engagement hydraulic chamber. The first coupling member and the second coupling member are disposed radially inward of the disengagement hydraulic chamber.

According to this configuration, the hub member of the brake of the automatic transmission includes the first hub member with which the friction plates are spline-engaged and which is spline-engaged with the transmission case, the second hub member disposed at one side of the first hub member in the axial direction and fitted into the transmission case, and the third hub member disposed at the other side of the first hub member in the axial direction and forming the engagement hydraulic chamber.

The first hub member forms the disengagement hydraulic chamber disposed radially inward of the friction plates, the second hub member is coupled to the one side of the first hub member in the axial direction by the first coupling member, and the third hub member is coupled to the other side of the first hub member in the axial direction by the second coupling member. The first coupling member and the second coupling member are disposed radially inward of the disengagement hydraulic chamber.

Therefore, since the first coupling member and the second coupling member are disposed radially inward of the disengagement hydraulic chamber, the radial spacing between the first coupling member and the second coupling member can be reduced, as compared with the case where the disengagement hydraulic chamber is disposed between the first coupling member and the second coupling member in the radial direction.

When the hydraulic fluid is supplied to the engagement hydraulic chamber during the brake being engaged and the piston is moved in the engaging direction, the first hub member can be suppressed from being deformed between the first coupling member and the second coupling member by forces which act on the first hub member from the axially opposite sides through the first coupling member and the second coupling member. Therefore, in the automatic transmission provided with the brake having the hub member coupled to the transmission case, a deformation of the hub member when engaging the brake can be suppressed.

Since the deformation of the hub member when engaging the brake can be suppressed, it can be suppressed that the positional accuracy of the piston is lowered, the hydraulic fluid is leaked, etc., and therefore, poor operation of the brake due to the deformation of the hub member can be suppressed.

The brake may further include a biasing member configured to bias the piston in the engaging direction from a disengaged position to a zero-clearance position.

According to this configuration, the piston can be moved by the biasing member from the disengaged position to the zero-clearance position with sufficient response and sufficient accuracy.

A valve body may be disposed below the transmission case, and the second hub member may be connected to the valve body so that hydraulic fluid is supplied to the second hub member from the valve body.

According to this configuration, since the second hub member which is fitted into the transmission case is connected to the valve body, the second hub member can be fixed to the transmission case, and therefore, the hydraulic fluid can be efficiently supplied to the second hub member from the valve body in the connecting part of the second hub member and the valve body.

The first hub member may include an outer hub member having the cylindrical part and spline-engaged with the transmission case, and an inner hub member having a cylindrical part disposed radially inward of the cylindrical part of the outer hub member. An oil supply passage for lubrication may be formed between the cylindrical part of the outer hub member and the cylindrical part of the inner hub member to supply hydraulic fluid for lubrication to the friction plates.

According to this configuration, since the oil supply passage for lubrication can be formed in the first hub member provided with the outer hub member and the inner hub member, by providing supply ports in the cylindrical part with which the friction plates are spline-engaged, the hydraulic fluid for lubrication can be efficiently supplied to the friction plates from the oil supply passage for lubrication, and therefore, the cooling efficiency of the friction plates can be improved.

BRIEF DESCRIPTION OF DRAWINGS

FIG. 2 is an engagement table for friction engagement elements of the automatic transmission.

DETAILED DESCRIPTION OF THE DISCLOSURE

Hereinafter, one embodiment of the present disclosure is described with reference to the accompanying drawings.

Figure 1:
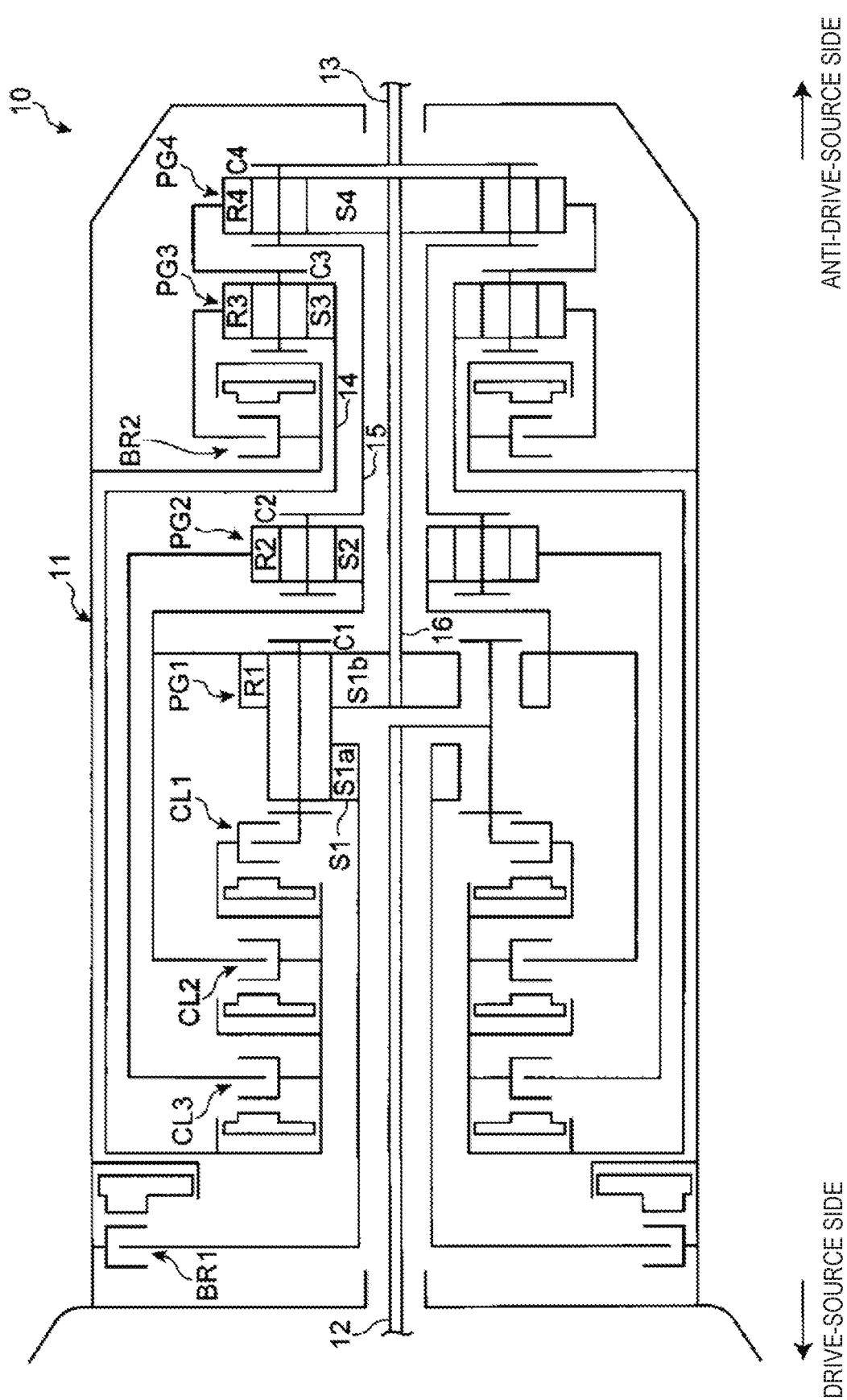
FIG. 1 is a view schematically illustrating an automatic transmission according to one embodiment of the present disclosure.

FIG. 1 is a view schematically illustrating an automatic transmission 10 according to one embodiment of the present disclosure. The automatic transmission 10 is coupled to a drive-source, such as an engine, without intervention of a hydraulic power transmission, such as a torque converter. The automatic transmission 10 has an input shaft 12 which is coupled to the drive-source and disposed inside a transmission case 11 at the drive-source side (left side in this drawing), and an output shaft 13 disposed to an anti-drive-source side (right side in this drawing). The automatic transmission 10 is a longitudinal type, such as for front-engine rear-drive vehicles, in which the input shaft 12 and the output shaft 13 are disposed coaxially.

Disposed on the axis of the input shaft 12 and the output shaft 13 are, from the drive-source side, first, second, third, and fourth planetary gear sets PG1, PG2, PG3, and PG4 (hereinafter, simply referred to as "first, second, third, and fourth gear sets").

Inside the transmission case 11, a first clutch CL1 is disposed at the drive-source side of the first gear set PG1, a second clutch CL2 is disposed at the drive-source side of the first clutch CL1, and a third clutch CL3 is disposed at the drive-source side of the second clutch CL2. Moreover, a first brake BR1 is disposed at the drive-source side of the third clutch CL3, and a second brake BR2 is disposed at the drive-source side of the third gear set PG3 and at the anti-drive-source side of the second gear set PG2.

The first, second, third, and fourth gear sets PG1, PG2, PG3, and PG4 are each single-pinion type in which a pinion supported by a carrier directly meshes with a sun gear and a ring gear. The first, second, third, and fourth gear sets PG1, PG2, PG3, and PG4 have, as rotating elements, sun gears S1, S2, S3, and S4, ring gears R1, R2, R3, and R4, and carriers C1, C2, C3, and C4, respectively.

The first gear set PG1 is a double sun gear type in which the sun gear S1 is divided into two in the axial direction. The sun gear S1 has a first sun gear S1a disposed at the drive-source side, and a second sun gear S1b disposed at the anti-drive-source side. The first and second sun gears S1a and S1b have the same number of teeth, and mesh with the same pinion supported by the carrier C1. Therefore, the first and second sun gears S1a and S1b always carry out the same rotation.

In the automatic transmission 10, the sun gear S1 of the first gear set PG1 (in detail, the second sun gear S1b) is always coupled to the sun gear S4 of the fourth gear set PG4, the ring gear R1 of the first gear set PG1 is always coupled to the sun gear S2 of the second gear set PG2, the carrier C2 of the second gear set PG2 is always coupled to the carrier C4 of the fourth gear set PG4, and the carrier C3 of the third gear set PG3 is always coupled to the ring gear R4 of the fourth gear set PG4.

The input shaft 12 is always coupled to the carrier C1 of the first gear set PG1 through between the first sun gear S1a and the second sun gear S1b, and the output shaft 13 is always coupled to the carrier C4 of the fourth gear set PG4.

The first clutch CL1 is disposed between the input shaft 12 and the carrier C1 of the first gear set PG1, and the sun gear S3 of the third gear set PG3, to engage and disengage therebetween, the second clutch CL2 is disposed between the ring gear R1 of the first gear set PG1 and the sun gear S2 of the second gear set PG2, and the sun gear S3 of the third gear set PG3, to engage and disengage therebetween, and the third clutch CL3 is disposed between the ring gear R2 of the second gear set PG2 and the sun gear S3 of the third gear set PG3, to engage and disengage therebetween.

The first brake BR1 is disposed between the transmission case 11 and the sun gear S1 of the first gear set PG1 (in detail, the first sun gear S1a), to engage and disengage therebetween, and the second brake BR2 is disposed between the transmission case 11 and the ring gear R3 of the third gear set PG3, to engage and disengage therebetween.

With the above structure, as illustrated in FIG. 2, the automatic transmission 10 forms the first to eighth gears in a D-range (Drive range) and the reverse gear in an R-range (Reverse range) by a combination of the engaging state of the first clutch CL1, the second clutch CL2, the third clutch CL3, the first brake BR1, and the second brake BR2.

In the automatic transmission 10, the second brake BR2 which is engaged at the 1st gear stage when a vehicle starts traveling is slip-controlled, and this second brake BR2 is an example of a brake of the automatic transmission according to the present disclosure. Below, the brake BR2 is described.

As illustrated in FIGS. 3 to 6, the brake BR2 is accommodated in the transmission case 11 formed in a substantially cylindrical shape, and is disposed at the outer circumferential side of a power transmission member 14 which is coupled to the sun gear S3 of the third gear set PG3 and with which one of a pair of inner and outer rotating members of each of the first, second, and third clutches CL1, CL2, and CL3 is integrated.

The power transmission member 14 is disposed at the outer circumferential side of a power transmission member 15 which couples the carrier C2 of the second gear set PG2 to the carrier C4 of the fourth gear set PG4, and the power transmission member 15 is disposed at the outer circumferential side of a power transmission member 16 which couples the sun gear S1 of the first gear set PG1 (in detail, the second sun gear S1b) to the sun gear S4 of the fourth gear set PG4.

The brake BR2 includes a hub member 20 coupled to the transmission case 11, a drum member 60 which is disposed at the anti-drive-source side of the hub member 20 and is coupled to the ring gear R3 of the third gear set PG3 which is a rotating member, a plurality of friction plates 70 which are lined up in the axial direction between the hub member 20 and the drum member 60, and a piston 80 which is disposed at the anti-drive-source side of the plurality of friction plates 70 and engages the plurality of friction plates 70.

The brake BR2 has, radially inward of the friction plates 70, a hydraulic chamber 90 to which hydraulic fluid for biasing the piston 80 is supplied. The hydraulic chamber 90 includes a hydraulic chamber 91 for engagement to which hydraulic fluid for engagement which biases the piston 80 in the engaging direction is supplied, and a hydraulic chamber 92 for disengagement to which hydraulic fluid for disengagement which biases the piston 80 in the disengaging direction is supplied.

Figure 3:
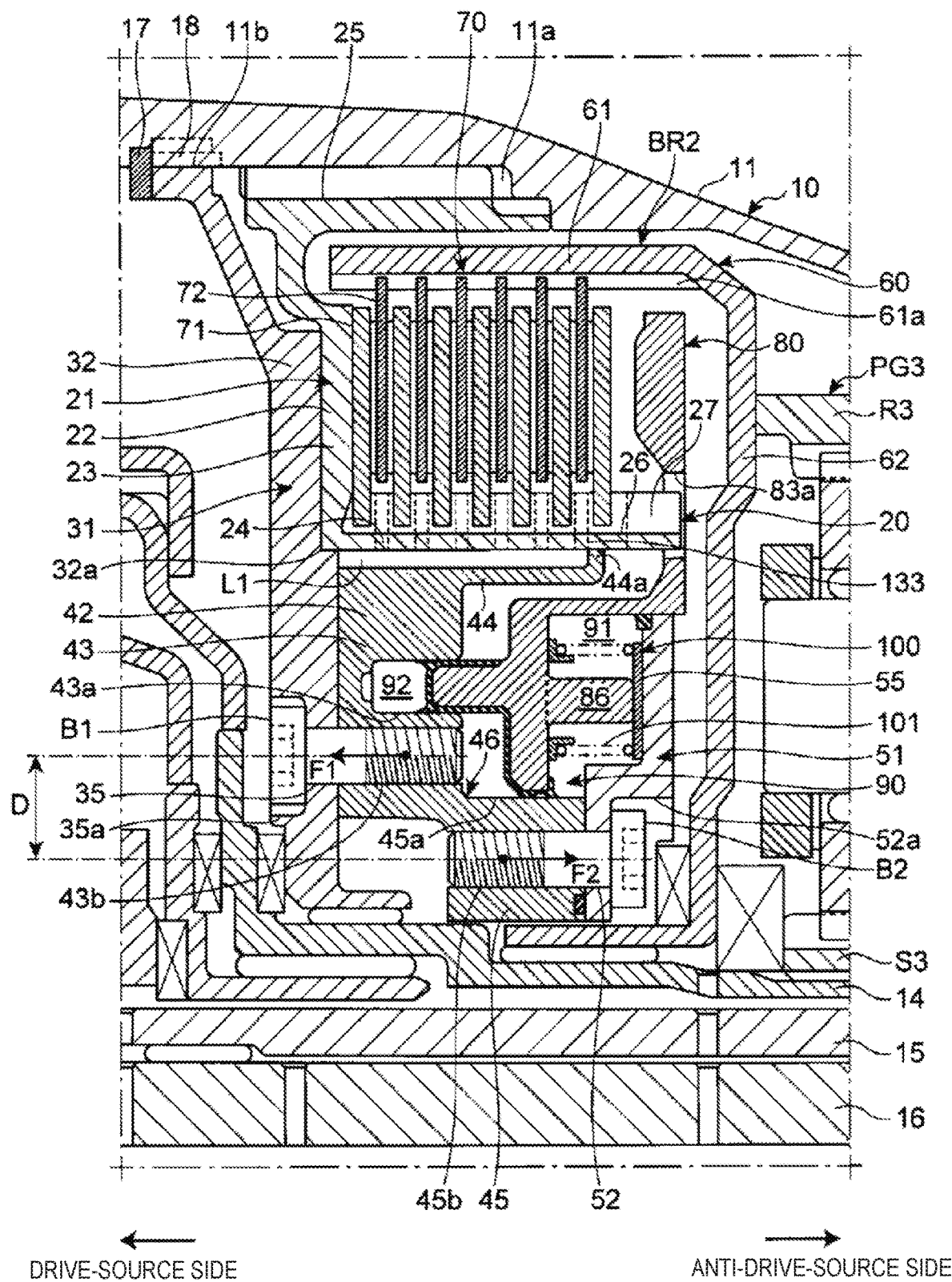
FIG. 3 is a cross-sectional view of a brake of the automatic transmission, and the periphery thereof.

As illustrated in FIG. 3, the brake BR2 has, radially inward of the friction plates 70, a biasing unit 100 which biases the piston 80. The biasing unit 100 includes springs 101 which cause a biasing force in the engaging direction to act on the piston 80 as a biasing member for biasing the piston 80.

Figure 6:
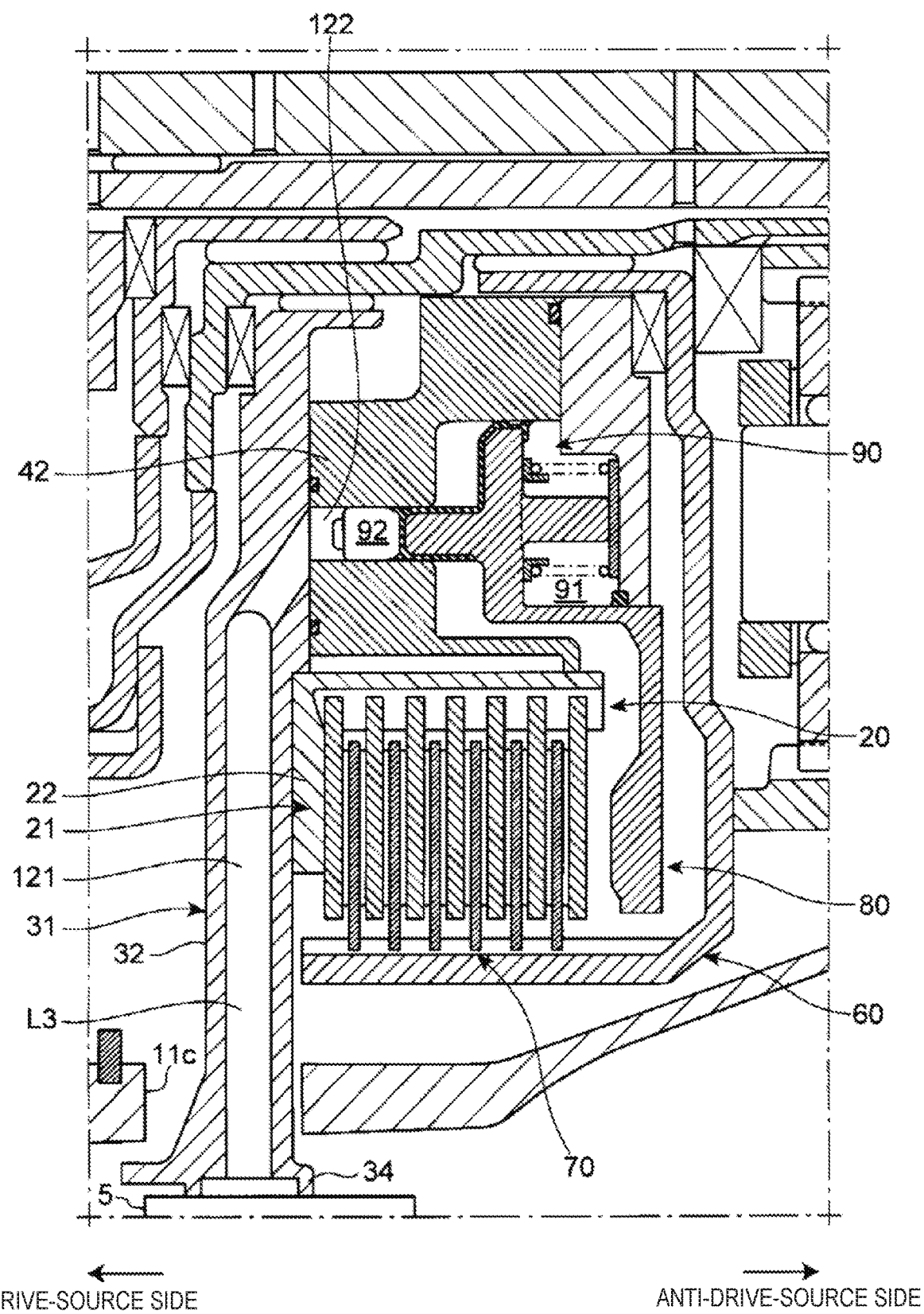
FIG. 6 is still another cross-sectional view of the brake of the automatic transmission, and the periphery thereof.
Figure 7:
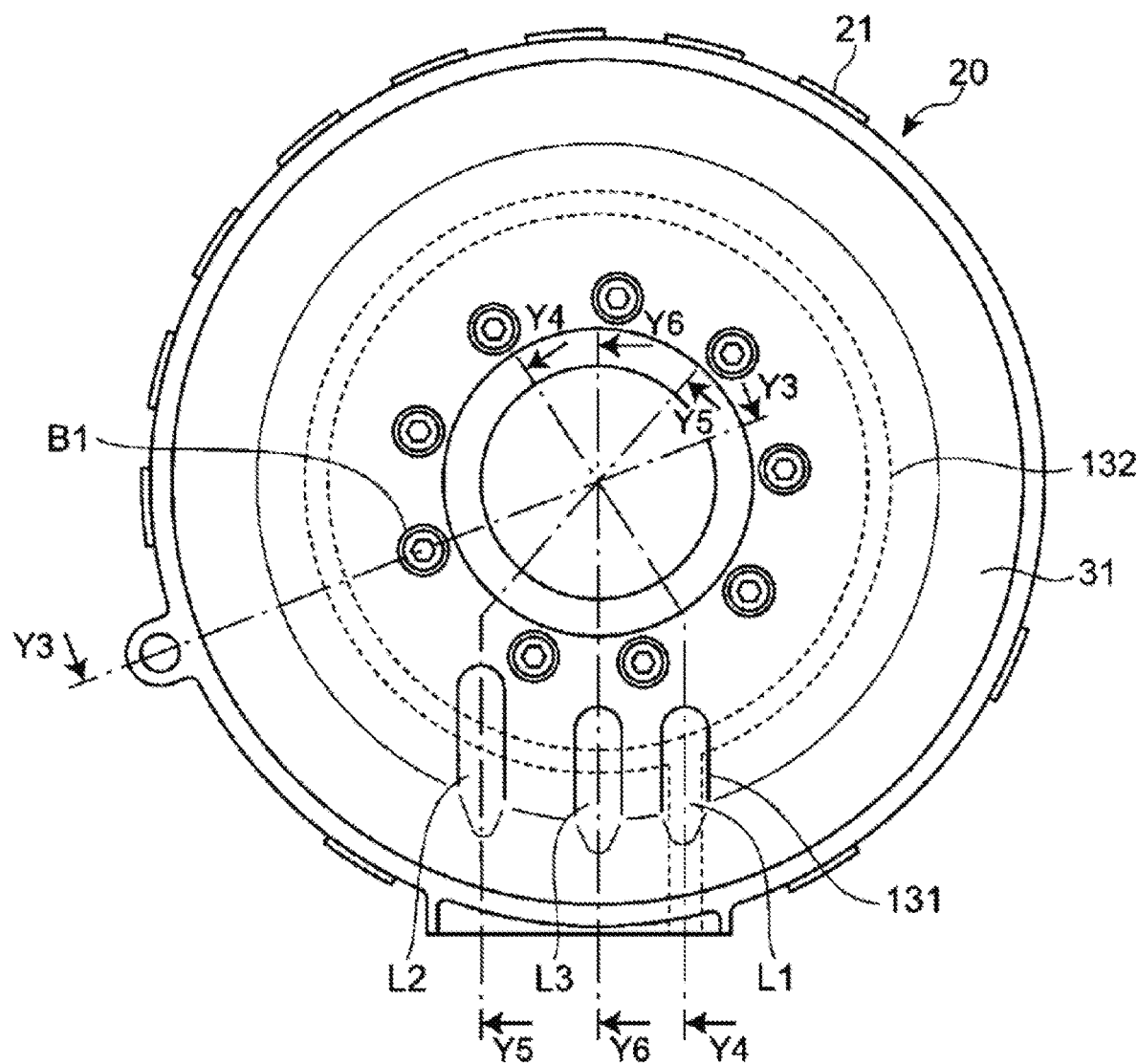
FIG. 7 is a front view of a hub member of the brake.

FIG. 7 is a front view of the hub member of the brake. FIGS. 3 to 6 illustrate cross sections of the brake BR2 of the automatic transmission 10 and the periphery thereof, corresponding to cross sections taken along lines Y3-Y3, Y4-Y4, Y5-Y5, and Y6-Y6 in FIG. 7, respectively.

As illustrated in FIGS. 3 to 7, the hub member 20 includes a first hub member 21 with which the friction plates 70 are spline-engaged and which is spline-engaged with the transmission case 11, a second hub member 31 which is disposed at the drive-source side of the first hub member 21 and is fitted into the transmission case 11, and a third hub member 51 which is disposed at the anti-drive-source side of the first hub member 21 and is fitted into the piston 80.

The first hub member 21 is comprised of an outer hub member 22 disposed radially outward of the automatic transmission 10, and an inner hub member 42 disposed radially inward of the automatic transmission 10.

As illustrated in FIG. 3, the outer hub member 22 includes a vertical wall part 23 which extends in a direction perpendicular to the axial direction of the transmission case 11 at the drive-source side of the plurality of friction plates 70, and is formed in a substantially disk shape, and a cylindrical part 24 which extends, radially inward of the vertical wall part 23, in a substantially cylindrical shape to the anti-drive-source side from the vertical wall part 23.

The outer hub member 22 has a spline part 25 where spline is formed in an outer circumferential surface of the vertical wall part 23, and is coupled to the transmission case 11 by spline-engaging the spline part 25 with a spline part 11a which is formed in an inner circumferential surface of the transmission case 11.

The cylindrical part 24 of the outer hub member 22 has a spline part 26 where spline is formed in an outer circumferential surface, and fixed-side friction plates 71 which constitute the friction plates 70 are spline-engaged with the spline part 26. The spline part 26 includes first teeth parts 27 each having a given axial length and spline-engaged with the plurality of friction plates 70 also in a disengaged state of the plurality of friction plates 70, and a second teeth part 28 each having the axial length shorter than the first teeth parts 27 and spline-engaged with the plurality of friction plates 70. A plurality of (in detail, three) first teeth parts 27 are disposed on the outer hub member 22 with a substantially equal interval in the circumferential direction.

As illustrated in FIG. 3, the inner hub member 42 includes a vertical wall part 43 which extends in a direction perpendicular to the axial direction of the transmission case 11 and is formed in a substantially disk shape, a first cylindrical part 44 extending substantially cylindrically to the anti-drive-source side from radially outward of the vertical wall part 43, and a second cylindrical part 45 extending substantially cylindrically to the anti-drive-source side from radially inward of the vertical wall part 43.

The first cylindrical part 44 of the inner hub member 42 is provided radially inward of the cylindrical part 24 of the outer hub member 22. The first cylindrical part 44 of the inner hub member 42 is provided with a flange part 44a on the anti-drive-source side, extending radially outward so as to contact the inner circumferential surface of the cylindrical part 24 of the outer hub member 22, to form, between the cylindrical part 24 of the outer hub member 22, an oil supply passage L1 for lubrication which supplies hydraulic fluid for lubrication to the friction plates 70.

A piston accommodating part 43a is formed in the vertical wall part 43 of the inner hub member 42 on the anti-drive-source side, which is dented to the drive-source side in a substantially rectangular shape in the cross section and extends in the circumferential direction. The piston accommodating part 43a constitutes a cylinder of the disengagement hydraulic chamber 92, and the piston 80 is fitted into the piston accommodating part 43a. The inner hub member 42 forms the disengagement hydraulic chamber 92 with the piston 80.

A plurality of threaded holes 43b are formed in the vertical wall part 43 of the inner hub member 42, radially inward of the disengagement hydraulic chamber 92, with which fastening bolts B1 as coupling members for coupling with the second hub member 31 disposed at the drive-source side are threadedly engaged. The plurality of threaded holes 43b extend in the axial direction, and are disposed on the same circumference of the vertical wall part 43 with spacing therebetween. For example, nine threaded holes 43b are formed as the plurality of threaded holes 43b.

The piston 80 is fitted into an outer circumferential surface 45a of the second cylindrical part 45 of the inner hub member 42 on the anti-drive-source side. The inner hub member 42 forms the engagement hydraulic chamber 91 with the piston 80 and the third hub member 51.

A plurality of threaded holes 45b are formed in the second cylindrical part 45 of the inner hub member 42, radially inward of the disengagement hydraulic chamber 92, with which fastening bolts B2 as coupling members for coupling with the third hub member 51 disposed at the anti-drive-source side are threadedly engaged. The plurality of threaded holes 45b extend in the axial direction and are disposed on the same circumference of the second cylindrical part 45 with spacing therebetween. For example, eight threaded holes 45b are formed in the second cylindrical part 45.

Figure 4:
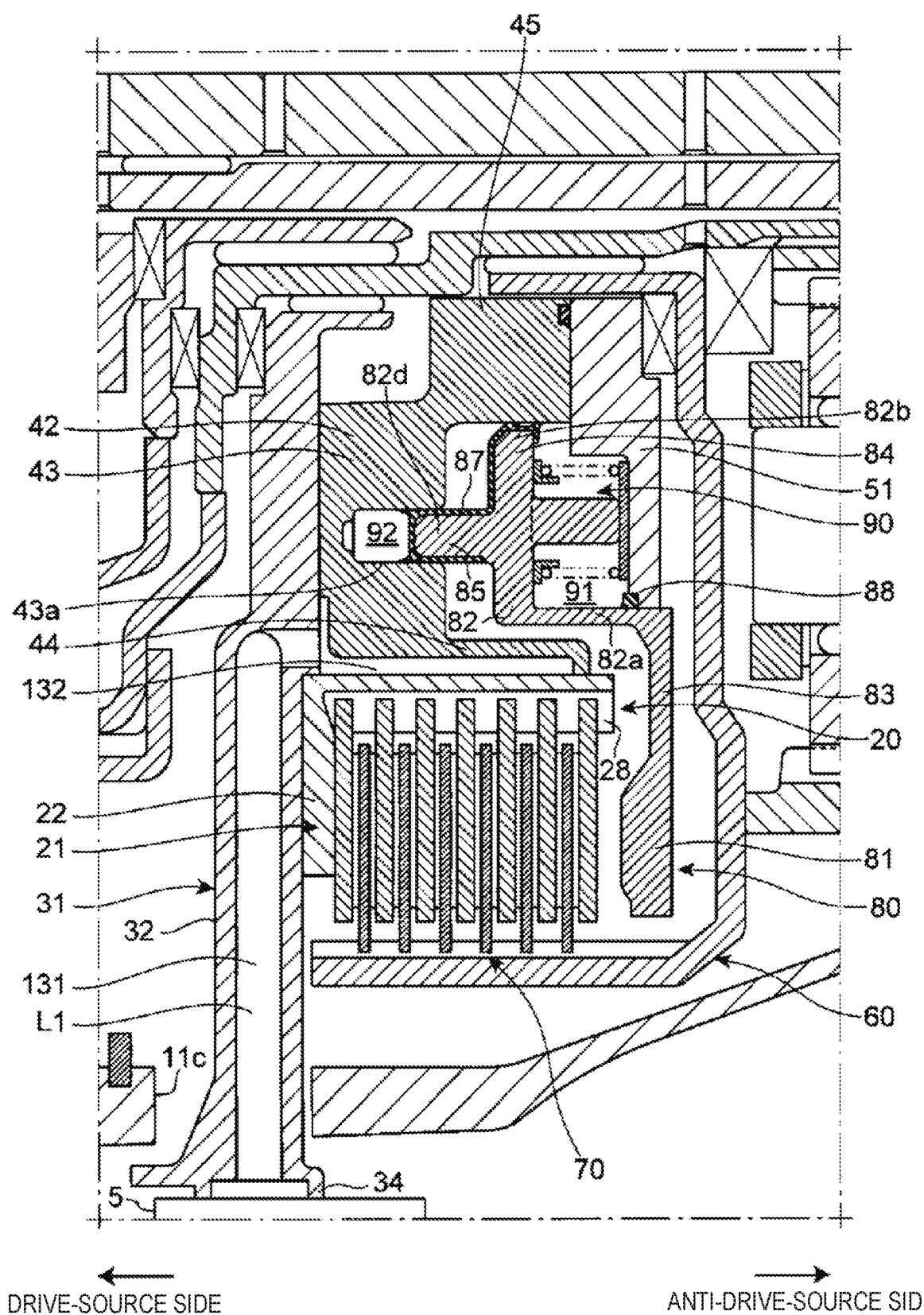
FIG. 4 is another cross-sectional view of the brake of the automatic transmission, and the periphery thereof.

As illustrated in FIG. 3, the second hub member 31 is provided with a vertical wall part 32 which extends in a direction perpendicular to the axial direction of the transmission case 11 and is formed in a substantially disk shape. As illustrated in FIG. 4, the oil supply passage L1 for lubrication which supplies hydraulic fluid for lubrication to the friction plates 70 is formed in the vertical wall part 32 of the second hub member 31.

An outer circumferential surface of the vertical wall part 32 of the second hub member 31 is fitted into an inner circumferential surface 11b of the transmission case 11 at the drive-source side of the spline part 25 of the first hub member 21. The second hub member 31 is coupled to the transmission case 11 by being prevented by a snap ring 17 from slipping off to the drive-source side, and being fixed to the transmission case 11 by using a rotation preventive pin 18. Note that the second hub member 31 may be coupled to the transmission case 11 by being press-fitted into and fixed to the inner circumferential surface 11b of the transmission case 11.

As illustrated in FIG. 4, below the transmission case 11, a valve body 5 which supplies hydraulic fluid to the hydraulic chamber 90 and the friction plates 70 of the brake BR2 is disposed. The valve body 5 is fixed to the transmission case 11 by being accommodated in an oil pan (not illustrated) attached to a position below the transmission case 11. The second hub member 31 has a valve body connecting part 34 for connecting to the valve body 5, and it is formed so that the oil supply passage L1 for lubrication is connected to the valve body 5 through a case opening 11c formed in the transmission case 11.

Figure 5:
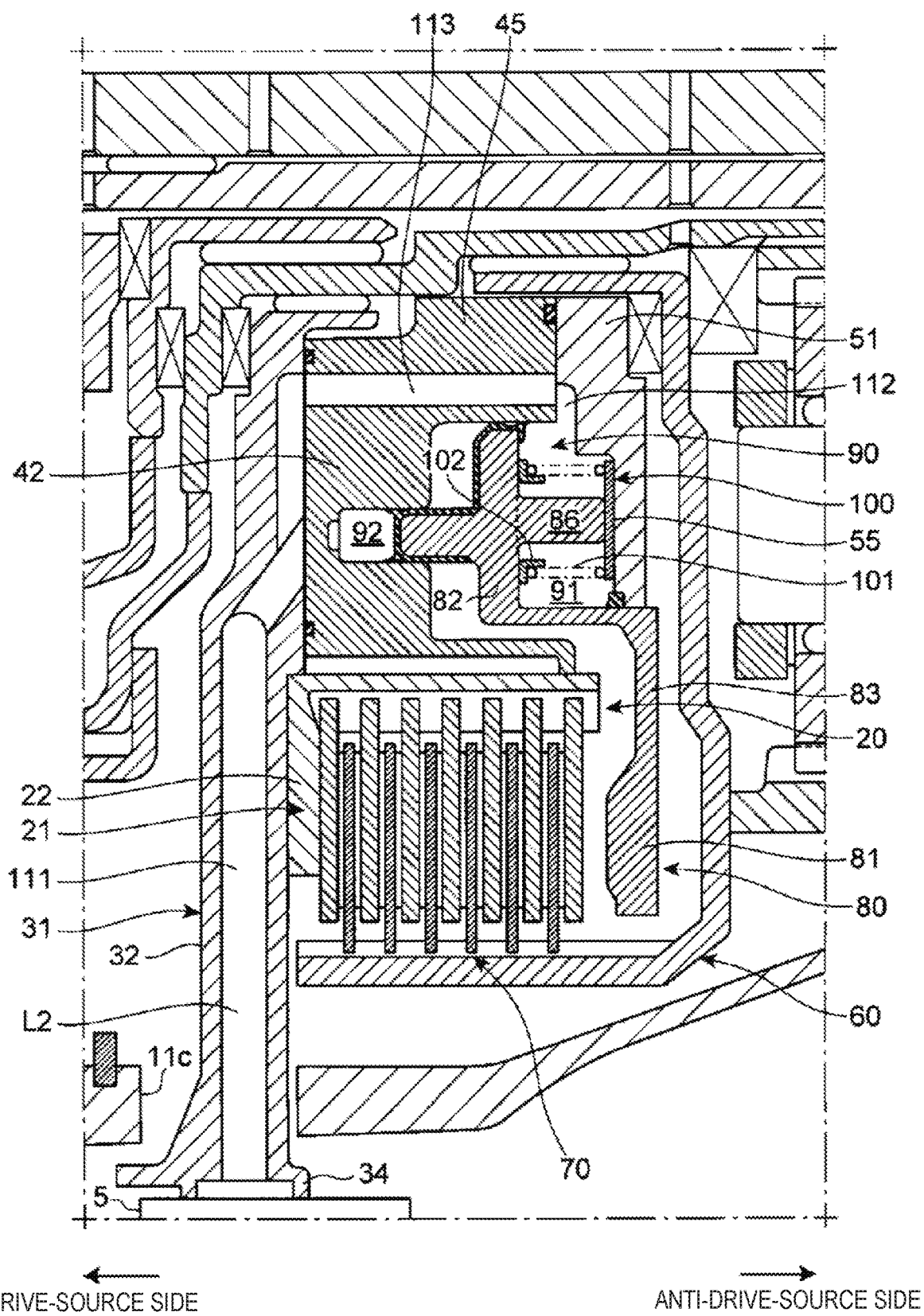
FIG. 5 is still another cross-sectional view of the brake of the automatic transmission, and the periphery thereof.

As illustrated in FIG. 5, in the vertical wall part 32 of the second hub member 31, an oil supply passage L2 for engagement which supplies hydraulic fluid for engagement to the engagement hydraulic chamber 91 is formed, and, as illustrated in FIG. 6, an oil supply passage L3 for disengagement which supplies hydraulic fluid for disengagement to the disengagement hydraulic chamber 92 is formed.

As illustrated in FIG. 7, the second hub member 31 is formed so that the oil supply passage L1 for lubrication, the oil supply passage L3 for disengagement, and the oil supply passage L2 for engagement are connected to the valve body 5. The second hub member 31 is connected to the valve body 5 so that hydraulic fluid can be supplied from the valve body 5.

As illustrated in FIG. 3, a stepped part 32a which is dented to the drive-source side is formed in the vertical wall part 32 of the second hub member 31 on the anti-drive-source side. The stepped part 32a of the second hub member 31 is formed so as to engage with the inner circumferential side of the vertical wall part 23 of the outer hub member 22, when the vertical wall part 23 of the outer hub member 22 of the first hub member 21 contacts the vertical wall part 32 of the second hub member 31.

A plurality of bolt insert holes 35 are formed in the vertical wall part 32 of the second hub member 31, radially inward of the vertical wall part 32, into which fastening bolts B1 are inserted. The bolt insert holes 35 of the second hub member 31 are formed corresponding to the threaded holes 43b of the first hub member 21, extend in the axial direction, and are disposed on the same circumference with spacing therebetween. Bolt accommodating holes 35a are each formed at the drive-source side of the bolt insert hole 35, in which the head of the fastening bolt B1 is accommodated.

The second hub member 31 is coupled to the drive-source side of the first hub member 21 with the fastening bolts B1 by threadedly engaging the plurality of fastening bolts B1 with the threaded holes 43b of the first hub member 21 through the bolt insert holes 35 from the drive-source side, respectively.

The third hub member 51 extends in a direction perpendicular to the axial direction of the transmission case 11, is formed in a substantially disk shape, and is disposed at the anti-drive-source side of the first hub member 21. A plurality of bolt insert holes 52 into which the fastening bolts B2 are inserted are formed radially inward of the third hub member 51. The bolt insert holes 52 of the third hub member 51 are formed corresponding to the threaded holes 45b of the first hub member 21, extend in the axial direction, and are disposed on the same circumference with spacing therebetween. Bolt accommodating holes 52a are each formed at the anti-drive-source side of the bolt insert hole 52, in which the head of the fastening bolt B2 is accommodated.

The third hub member 51 is coupled to the anti-drive-source side of the first hub member 21 by the fastening bolts B2 by threadedly engaging the plurality of fastening bolts B2 with the threaded holes 45b of the first hub member 21 through the bolt insert holes 52 from the anti-drive-source side.

The third hub member 51 is formed so as to extend radially outward of the second cylindrical part 45 of the inner hub member 42 of the first hub member 21, and the outer circumferential surface of the third hub member 51 is fitted onto the piston 80. A regulating member 55 is disposed at the drive-source side of the third hub member 51, which regulates the piston 80 at a given disengaged position when it contacts a stop part 86 of the piston 80.

In the hub member 20, the first hub member 21 (in detail, the outer hub member 22 and the inner hub member 42), the second hub member 31, and the third hub member 51 are made of the same aluminum-based material.

The drum member 60 includes a cylindrical part 61 which is disposed opposing to the outer circumferential side of the cylindrical part 24 of the outer hub member 22 of the first hub member 21 and extends substantially cylindrically in the axial direction, and a vertical wall part 62 which extends in a direction perpendicular to the axial direction of the transmission case 11 radially inwardly from the anti-drive-source side of the cylindrical part 61 and is formed in a substantially disk shape.

The vertical wall part 62 of the drum member 60 is coupled to the ring gear R3 as a rotating member. The cylindrical part 61 of the drum member 60 has a spline part 61a where splines are formed in the inner circumferential surface, and rotation-side friction plates 72 which constitute the friction plates 70 are spline-engaged with the spline part 61a. The fixed-side friction plates 71 and the rotation-side friction plates 72 are disposed alternately in the axial direction.

The piston 80 is disposed between the hub member 20 and the drum member 60 (in detail, between the cylindrical part 24 of the outer hub member 22 of the first hub member 21 and the cylindrical part 61 of the drum member 60), extends radially inward of the plurality of friction plates 70, and is slidably fitted onto the outer circumferential surface of the second cylindrical part 45 of the inner hub member 42 of the first hub member 21.

As illustrated in FIG. 4, the piston 80 is formed annularly and includes a pressing part 81 which is provided to the outer circumferential side and presses the friction plates 70, a hydraulic chamber forming part 82 which is provided to the inner circumferential side and forms the hydraulic chamber 90, and a coupling part 83 which couples the pressing part 81 to the hydraulic chamber forming part 82.

The hydraulic chamber forming part 82 of the piston 80 includes a hydraulic chamber forming part 84 for engagement which forms the engagement hydraulic chamber 91, and a hydraulic chamber forming part 85 for disengagement which forms the disengagement hydraulic chamber 92. A sealing member 87 is attached to the radially inward part of the piston 80, and a sealing member 88 is attached to the radially outward part of the third hub member 51.

The pressing part 81 of the piston 80 is disposed at the anti-drive-source side of the friction plates 70, the hydraulic chamber forming part 82 is disposed radially inward of the friction plates 70, and the coupling part 83 extends radially inward of the friction plates 70 from the anti-drive-source side of the friction plates 70 so that it couples the pressing part 81 to the hydraulic chamber forming part 82. The hydraulic chamber forming part 82 is provided so as to project to the drive-source side from the coupling part 83.

The hydraulic chamber forming part 82 includes an outer cylinder part 82a which is fitted onto the outer circumferential side of the third hub member 51 through the sealing member 88 and extends in the axial direction, and a hydraulic pressure for engagement receiving part 82b which extends radially inward from the drive-source side of the outer cylinder part 82a and is slidably fitted into the second cylindrical part 45 of the inner hub member 42 of the first hub member 21 through the sealing member 87. The hydraulic chamber 91 for engagement is formed by the piston 80, the inner hub member 42 of the first hub member 21, and the third hub member 51.

The hydraulic chamber forming part 82 is provided with a hydraulic pressure for disengagement receiving part 82d in which the radially center side of the hydraulic pressure receiving part 82b for engagement projects to the drive-source side in the axial direction and is slidably fitted into the piston accommodating part 43a of the inner hub member 42 of the first hub member 21 through the sealing member 87. The disengagement hydraulic chamber 92 is formed by the piston 80 and the inner hub member 42 of the first hub member 21.

As illustrated in FIG. 3, a notch 83a is formed in the coupling part 83 of the piston 80 by notching corresponding to the spline part 26 (in detail, the first teeth parts 27) of the cylindrical part 24 of the outer hub member 22. The first teeth parts 27 of the cylindrical part 24 of the outer hub member 22 are fitted into the notch 83a of the piston 80, and the notch 83a regulates that the piston 80 rotates in the circumferential direction.

As illustrated in FIG. 5, the biasing unit 100 is disposed inside the engagement hydraulic chamber 91. The biasing unit 100 includes the plurality of springs 101 comprised of coil springs extending in the axial direction, and a holding plate 102 which is formed annularly and holds end parts of the plurality of springs 101 on the drive-source side.

The biasing unit 100 is attached to the hub member 20 by the drive-source side of the holding plate 102 being supported by the anti-drive-source side of the hydraulic chamber forming part 82 of the piston 80, and the anti-drive-source side of the plurality of springs 101 being supported by the drive-source side of the third hub member 51 through the regulating member 55. The biasing unit 100 is configured so that, when the springs 101 reach its free length, the piston 80 is located at a zero-clearance position where the plurality of friction plates 70 become in a zero-clearance state.

Thus, the biasing unit 100 causes the springs 101 to act a biasing force on the piston 80 in the engaging direction from the disengaged position to the zero-clearance position. Then, when the hydraulic pressure for engagement is supplied to the engagement hydraulic chamber 91 when the piston 80 is at the zero-clearance position, the piston 80 presses the plurality of friction plates 70 to move the plurality of friction plates 70 to an engaged position where the plurality of friction plates 70 becomes in an engaged state in which they are sandwiched between the vertical wall part 23 of the outer hub member 22 of the first hub member 21 and the piston 80 and become impossible of relative rotation.

On the other hand, when the hydraulic pressure for engagement is discharged from the engagement hydraulic chamber 91 and the hydraulic pressure for disengagement is supplied to the disengagement hydraulic chamber 92 when the piston 80 is at the engaged position, the piston 80 is biased and moved in the disengaging direction so that the piston 80 is moved to the zero-clearance position. Further, the piston 80 is biased and moved in the disengaging direction while resisting the springs 101, and it is moved to the disengaged position where the stop part 86 of the piston 80 contacts the regulating member 55. The springs 101 function as a biasing member which causes the biasing force to act on the piston 80 in the engaging direction from the disengaged position to the zero-clearance position.

As illustrated in FIG. 3, since in the automatic transmission 10 the fastening bolts B1 and fastening bolts B2 are disposed radially inward of the disengagement hydraulic chamber 92, a radial spacing D between the fastening bolt B1 and fastening bolt B2 can be made small, as compared with a case where the disengagement hydraulic chamber is disposed between the fastening bolts B1 and the fastening bolts B2 in the radial direction.

Next, the oil supply passage which supplies the hydraulic fluid to the brake BR2 is described. The oil supply passage L1 for lubrication which supplies the hydraulic fluid for lubrication to the friction plates 70 is formed in the first hub member 21 and the second hub member 31. The oil supply passage L2 for engagement which supplies the hydraulic fluid for engagement to the engagement hydraulic chamber 91 is formed in the first hub member 21, the second hub member 31, and the third hub member 51. The oil supply passage L3 for disengagement which supplies the hydraulic fluid for disengagement to the disengagement hydraulic chamber 92 is formed in the first hub member 21 and the second hub member 31.

As illustrated in FIGS. 3 and 4, the oil supply passage L1 for lubrication includes a radial oil passage 131 which is formed in the vertical wall part 32 of the second hub member 31 and extends in the radial direction, a circumferential oil passage 132 which is connected to the radial oil passage 131 of the second hub member 31 and is provided annularly in the circumferential direction between the cylindrical part 24 of the outer hub member 22 and the first cylindrical part 44 of the inner hub member 42, supply ports 133 which are provided to the cylindrical part 24 of the outer hub member 22, are connected to the circumferential oil passage 132, open in the outer circumferential surface of the cylindrical part 24 of the outer hub member 22, and supply the hydraulic fluid for lubrication to the friction plates 70.

A plurality of supply ports 133 are lined up in the axial direction of the cylindrical part 24 of the outer hub member 22, and are separated from each other in the circumferential direction of the cylindrical part 24 of the outer hub member 22. The supply ports 133 are preferably formed so as to open to tip ends of the teeth parts 27 and 28 of the spline part 26 of the cylindrical part 24 of the outer hub member 22.

The radial oil passage 131 of the second hub member 31 is formed in the vertical wall part 32 of the second hub member 31, opens in a lower surface of the valve body connecting part 34, and is connected to the valve body 5. The valve body 5 can supply the hydraulic fluid for lubrication to the plurality of friction plates 70 through the oil supply passage L1 for lubrication.

As illustrated in FIG. 5, the oil supply passage L2 for engagement is comprised of a radial oil passage 111 which is formed in the vertical wall part 32 of the second hub member 31 and extends in the radial direction, and an axial oil passage 113 which is formed in the second cylindrical part 45 of the inner hub member 42, is connected to the radial oil passage 111 of the second hub member 31, extends in the axial direction, and which opens and is connected to the engagement hydraulic chamber 91 through a radial oil passage 112 which is formed in the third hub member 51 and extends in the radial direction. The radially inward of the radial oil passage 111 of the second hub member 31 is covered by the inner hub member 42, and the radial oil passage 112 of the third hub member 51 is covered by the inner hub member 42.

The radial oil passage 111 of the second hub member 31 is formed in the vertical wall part 32 of the second hub member 31, opens in the lower surface of the valve body connecting part 34, and is connected to the valve body 5. The valve body 5 supplies the hydraulic fluid for engagement to the engagement hydraulic chamber 91 through the oil supply passage L2 for engagement to supply a given hydraulic pressure for engagement.

As illustrated in FIG. 6, the oil supply passage L3 for disengagement is comprised of a radial oil passage 121 which is formed in the vertical wall part 32 of the second hub member 31 and extends in the radial direction, an axial oil passage 122 which is formed in the vertical wall part 43 of the inner hub member 42, is connected to the radial oil passage 121 of the second hub member 31, extends in the axial direction, and which opens and is connected to the disengagement hydraulic chamber 92. The radially inward of the radial oil passage 121 of the second hub member 31 is covered by the inner hub member 42.

The radial oil passage 121 of the second hub member 31 is formed in the vertical wall part 32 of the second hub member 31, opens in the lower surface of the valve body connecting part 34, and is connected to the valve body 5. The valve body 5 supplies the hydraulic fluid for disengagement to the disengagement hydraulic chamber 92 through the oil supply passage L3 for disengagement to supply a given hydraulic pressure for disengagement.

As illustrated in FIG. 7, in the automatic transmission 10, the radial oil passages 111, 121, and 131 which respectively constitute the oil supply passage L2 for engagement, the oil supply passage L3 for disengagement, and the oil supply passage L1 for lubrication are lined up in the circumferential direction. The circumferential oil passage 132 which constitutes the oil supply passage L1 for lubrication is connected to the radial oil passage 131 and extends annularly in the circumferential direction.

Figure 8:
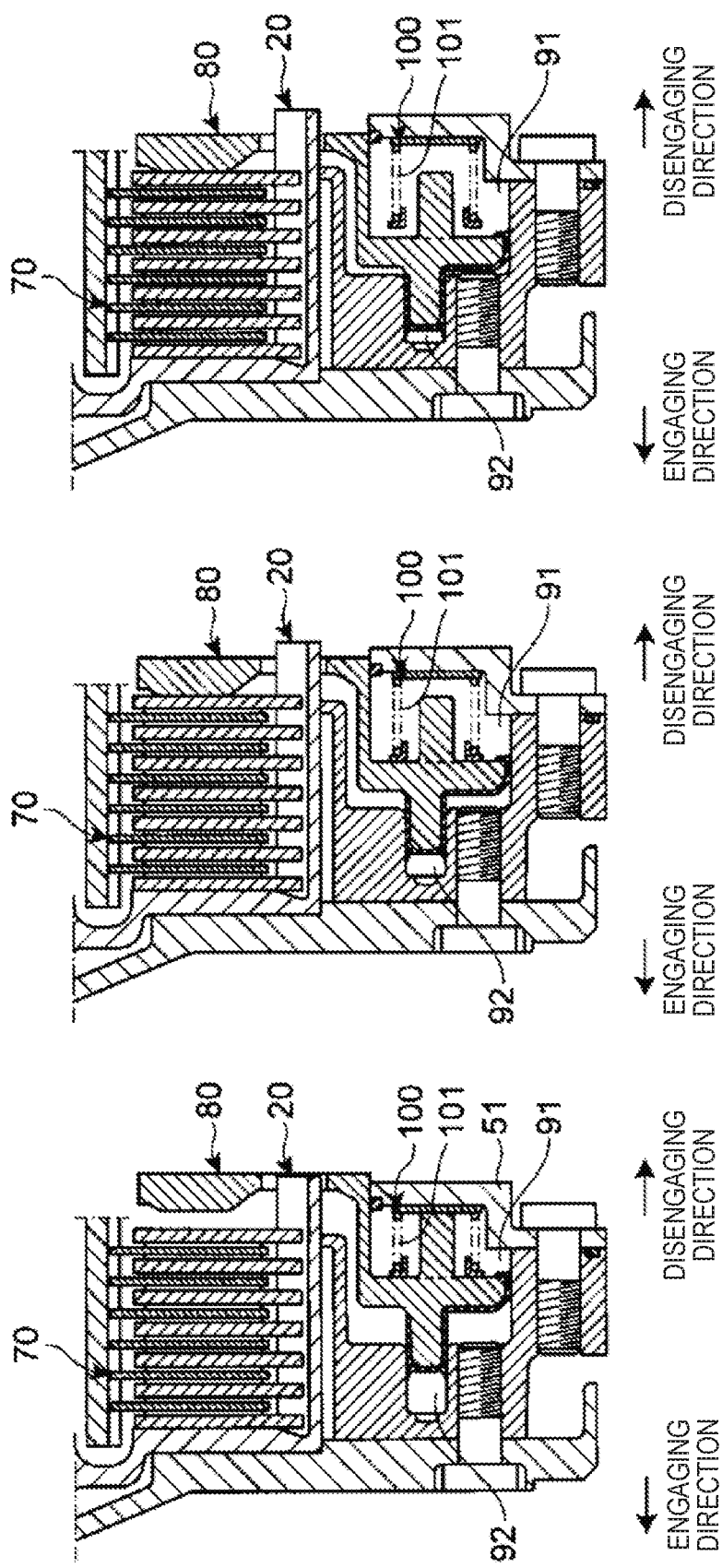
FIGS. 8A to 8C are cross-sectional views illustrating the brake in a disengaged state, a zero-clearance state, and an engaged state, respectively.
Figure 9:
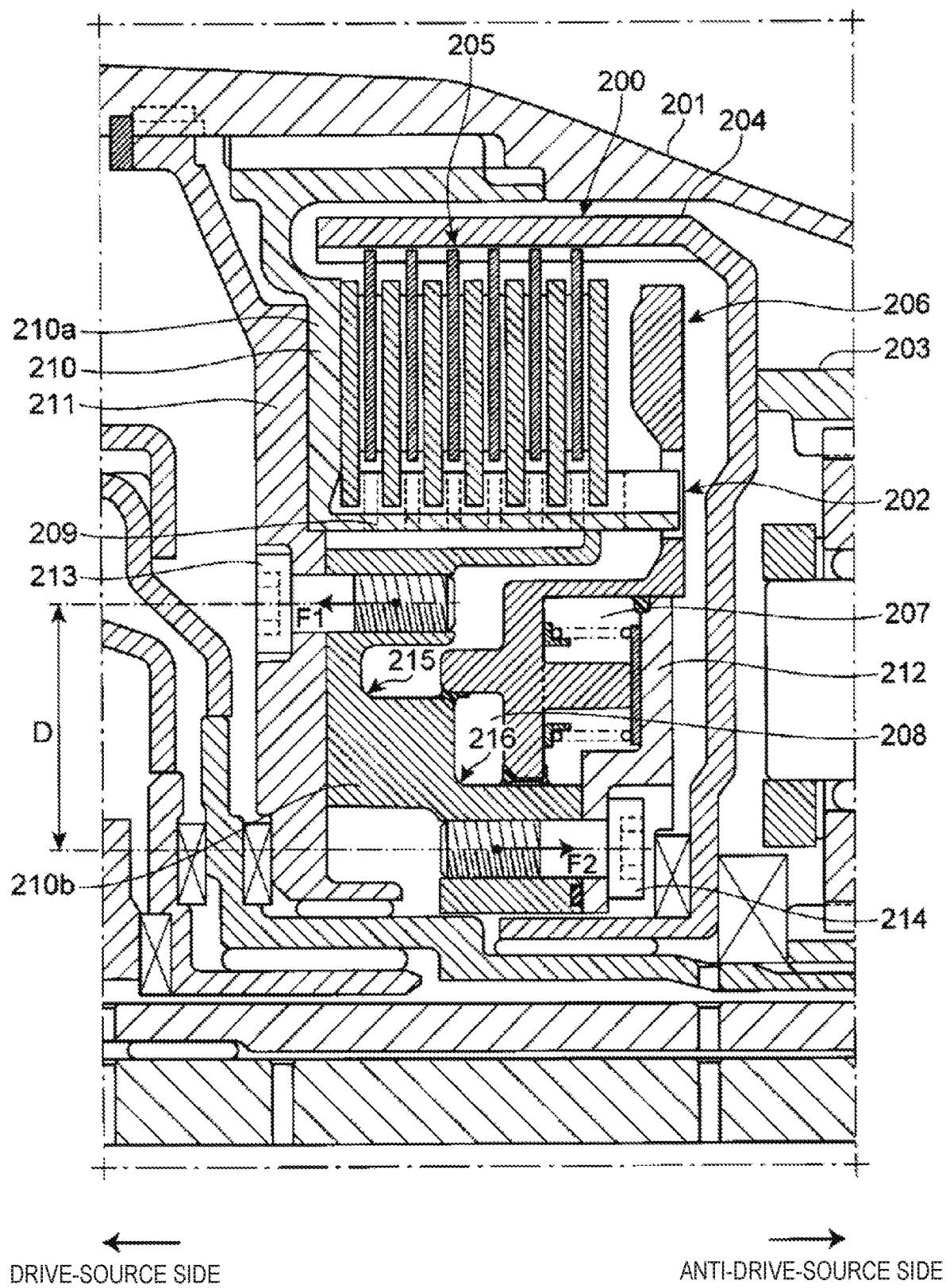
FIG. 9 is a cross-sectional view illustrating a brake of a conventional automatic transmission.

Next, operation of the brake BR2 constructed in this way is described. FIGS. 8A to 8C are cross-sectional views illustrating the brake in the disengaged state, the zero-clearance state, and the engaged state, respectively. FIGS. 8A to 8C illustrate a substantial part of the brake BR2 illustrated in FIG. 3.

In FIG. 8A, the disengaged state of the brake BR2 is illustrated, in which the hydraulic pressure for engagement is discharged from the engagement hydraulic chamber 91 and the hydraulic pressure for disengagement is supplied to the disengagement hydraulic chamber 92 to compress the springs 101 through the piston 80 and move the piston 80 in the disengaging direction which is on the anti-drive-source side, and therefore, the piston 80 is located at the disengaged position where the plurality of friction plates 70 become in the disengaged state.

When engaging the brake BR2, as illustrated in FIG. 8B, the hydraulic pressure for disengagement is discharged from the disengagement hydraulic chamber 92 in the disengaged state (FIG. 8A), the piston 80 is moved in the engaging direction by receiving the biasing force of the springs 101 until the springs 101 reach the free length, and the piston 80 is then located at the zero-clearance position where the piston 80 becomes in the zero-clearance state in which the piston 80 contacts or substantially contacts the friction plates 70 without pressing the plurality of friction plates 70, and therefore, the brake BR2 becomes in the zero-clearance state.

Then, in the zero-clearance state illustrated in FIG. 8B, when the hydraulic pressure for engagement is supplied to the engagement hydraulic chamber 91, the piston 80 is biased and moved in the engaging direction by the hydraulic pressure for engagement supplied to the engagement hydraulic chamber 91, the piston 80 presses the plurality of friction plates 70 and is the located at the engaged position where the relative rotation of the plurality of friction plates 70 becomes impossible, and therefore, the brake BR2 becomes in the engaged state as illustrated in FIG. 8C.

On the other hand, when disengaging the brake BR2, in the engaged state illustrated in FIG. 8C, the hydraulic pressure for engagement is discharged from the engagement hydraulic chamber 91 and the hydraulic pressure for disengagement is supplied to the disengagement hydraulic chamber 92, and the piston 80 is biased and moved in the disengaging direction which is on the anti-drive-source side by the hydraulic pressure for disengagement supplied to the disengagement hydraulic chamber 92, and therefore, the brake BR2 becomes in the disengaged state illustrated in FIG. 8A through the zero-clearance state illustrated in FIG. 8B.

In the brake BR2, the piston 80 can be moved by the springs 101 from the disengaged position to the zero-clearance position with sufficient response and sufficient accuracy. Note that in the disengaged state illustrated in FIG. 8A, when the hydraulic pressure for disengagement is discharged from the disengagement hydraulic chamber 92 and the piston 80 is moved in the engaging direction, the hydraulic fluid may be pre-charged to the engagement hydraulic chamber 91 so that the piston 80 is moved promptly.

As described above, the brake BR2 is slip-controlled when the vehicle starts traveling. When engaging the brake BR2, after the hydraulic pressure lower than the hydraulic pressure for engagement is supplied to the engagement hydraulic chamber 91 so that the plurality of friction plates 70 are made into a slip state, the hydraulic pressure for engagement is supplied to the engagement hydraulic chamber 91 so that the plurality of friction plates 70 are engaged. On the other hand, when disengaging the brake BR2, after the hydraulic pressure lower than the hydraulic pressure for disengagement is supplied to the disengagement hydraulic chamber 92 so that the plurality of friction plates 70 are made into the slip state, the hydraulic pressure for disengagement is supplied to the disengagement hydraulic chamber 92 so that the plurality of friction plates 70 are disengaged.

When engaging and disengaging the brake BR2, the hydraulic fluid for lubrication is supplied to the plurality of friction plates 70 through the oil supply passage L1 for lubrication, and the hydraulic fluid for lubrication is supplied to the plurality of friction plates 70 through the oil supply passage L1 for lubrication when the brake BR2 is slip-controlled.

In this embodiment, although the first hub member 21 is comprised of the outer hub member 22 and the inner hub member 42 which are separate members, the outer hub member 22 and the inner hub member 42 may be formed integrally.

Thus, in the automatic transmission 10 according to this embodiment, the hub member 20 of the brake BR2 includes the first hub member 21 with which the friction plates 70 are spline-engaged and which is spline-engaged with the transmission case 11, and which forms the disengagement hydraulic chamber 92, the second hub member 31 which is fitted into the transmission case 11 and is coupled to one side of the first hub member 21 in the axial direction by the first coupling member B1, and the third hub member 51 which is coupled to the other side of the first hub member 21 in the axial direction by the second coupling member B2 and forms the engagement hydraulic chamber 91. The first coupling member B1 and the second coupling member B2 are disposed radially inward of the disengagement hydraulic chamber 92.

Therefore, since the first coupling member B1 and the second coupling member B2 are disposed radially inward of the disengagement hydraulic chamber 92, the radial spacing D between the first coupling member B1 and the second coupling member B2 can be reduced, as compared with the case where the disengagement hydraulic chamber is disposed between the first coupling member B1 and the second coupling member B2 in the radial direction.

When the hydraulic fluid is supplied to the engagement hydraulic chamber 91 during the brake being engaged and the piston 80 is moved in the engaging direction, it can be suppressed that the first hub member 21 is deformed between the first coupling member B1 and the second coupling member B2 by forces F1 and F2 which act on the first hub member 21 from the axially opposite sides through the first coupling member B1 and the second coupling member B2. Therefore, in the automatic transmission 10 provided with brake BR2 having the hub member 20 coupled to the transmission case 11, a deformation of the hub member 20 when engaging the brake BR2 can be suppressed.

As illustrated in FIG. 3, also when a recess 46 is formed between the first coupling member B1 and the second coupling member B2 in the radial direction of the hub member 20, a deformation that occurs in the recess 46, which would become a stress concentrating part, is suppressed.

Since the deformation of the hub member 20 when engaging the brake BR2 can be suppressed, it can be suppressed that the positional accuracy of the piston 80 is lowered, the hydraulic fluid is leaked, etc., and therefore, poor operation of the brake BR2 due to the deformation of the hub member 20 can be suppressed.

Moreover, the valve body 5 is disposed below the transmission case 11, and the second hub member 31 is connected to the valve body 5 so that the hydraulic fluid can be supplied from the valve body 5. Thus, since the second hub member 31 which is fitted into the transmission case 11 is connected to the valve body 5, the second hub member 31 can be fixed to the transmission case 11, and therefore, the hydraulic fluid can be efficiently supplied to the second hub member 31 from the valve body 5 in the connecting part of the second hub member 31 and the valve body 5.

Moreover, the first hub member 21 includes the outer hub member 22 which has the cylindrical part 24 and is spline-engaged with the transmission case 11, and the inner hub member 42 which has the cylindrical part 44 disposed radially inward of the cylindrical part 24 of the outer hub member 22. The oil supply passage L1 for lubrication which supplies the hydraulic fluid for lubrication to the friction plates 70 between the cylindrical part 24 of the outer hub member 22 and the cylindrical part 44 of the inner hub member 42 is formed.

Thus, since the oil supply passage L1 for lubrication can be formed in the first hub member 21 provided with the outer hub member 22 and the inner hub member 42, by providing the supply ports 133 in the cylindrical part 24 with which the friction plates 70 are spline-engaged, the hydraulic fluid for lubrication can be efficiently supplied to the friction plates 70 from the oil supply passage L1 for lubrication, and therefore, the cooling efficiency of the friction plates 70 can be improved.

The present disclosure is not limited to the illustrated embodiment, and various improvements and design alterations are possible without departing from the spirit of the present disclosure.

As described above, according to the present disclosure, since the automatic transmission provided with the brake having the hub member coupled to the transmission case is possible to suppress the deformation of the hub member when engaging the brake, it may be suitably used in the manufacturing technology field of vehicles where this automatic transmission or this type of the automatic transmission is amounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

10 Automatic Transmission
11 Transmission Case
20 Hub Member
21 First Hub Member
22 Outer Hub Member
31 Second Hub Member
42 Inner Hub Member
51 Third Hub Member
60 Drum Member
70 Friction Plate
80 Piston
90 Hydraulic Chamber
91 Engagement Hydraulic Chamber
92 Disengagement Hydraulic Chamber
101 Spring
BR2 Second Brake
B1, B2 Fastening Bolt

What is claimed is:

1. An automatic transmission, comprising:
a brake including:
  a hub member coupled to a transmission case;
  a drum member coupled to a given rotating member;
  a plurality of friction plates disposed between the hub member and the drum member;
  a piston configured to engage the plurality of friction plates;
  an engagement hydraulic chamber to which hydraulic fluid is supplied to bias the piston in an engaging direction; and
  a disengagement hydraulic chamber to which hydraulic fluid is supplied to bias the piston in a disengaging direction,
wherein the piston extends radially inward of the plurality of friction plates,
wherein the engagement hydraulic chamber and the disengagement hydraulic chamber are disposed radially inward of the plurality of friction plates,
wherein the hub member includes:
  a first hub member having a cylindrical part spline-engaged with the friction plates, spline-engaged with the transmission case, and forming the disengagement hydraulic chamber;
  a second hub member disposed at one side of the first hub member in the axial direction, fitted into the transmission case, and coupled to the one side of the first hub member in the axial direction by a first coupling member; and
  a third hub member disposed at the other side of the first hub member in the axial direction, coupled to the other side of the first hub member in the axial direction by a second coupling member, and forming the engagement hydraulic chamber, and wherein the first coupling member and the second coupling member are disposed radially inward of the disengagement hydraulic chamber.

2. The automatic transmission of claim 1, wherein the brake further includes a biasing member configured to bias the piston in the engaging direction from a disengaged position to a zero-clearance position.

3. The automatic transmission of claim 2,
wherein a valve body is disposed below the transmission case, and
wherein the second hub member is connected to the valve body so that hydraulic fluid is supplied to the second hub member from the valve body.

4. The automatic transmission of claim 3,
wherein the first hub member includes:
   an outer hub member having the cylindrical part and spline-engaged with the transmission case; and
   an inner hub member having a cylindrical part disposed radially inward of the cylindrical part of the outer hub member, and
wherein an oil supply passage for lubrication is formed between the cylindrical part of the outer hub member and the cylindrical part of the inner hub member to supply hydraulic fluid for lubrication to the friction plates.

5. The automatic transmission of claim 1,
wherein a valve body is disposed below the transmission case, and
wherein the second hub member is connected to the valve body so that hydraulic fluid is supplied to the second hub member from the valve body.

6. The automatic transmission of claim 5,
wherein the first hub member includes:
   an outer hub member having the cylindrical part and spline-engaged with the transmission case; and
   an inner hub member having a cylindrical part disposed radially inward of the cylindrical part of the outer hub member, and
wherein an oil supply passage for lubrication is formed between the cylindrical part of the outer hub member and the cylindrical part of the inner hub member to supply hydraulic fluid for lubrication to the friction plates.

7. The automatic transmission of claim 1,
wherein the first hub member includes:
   an outer hub member having the cylindrical part and spline-engaged with the transmission case; and
   an inner hub member having a cylindrical part disposed radially inward of the cylindrical part of the outer hub member, and
wherein an oil supply passage for lubrication is formed between the cylindrical part of the outer hub member and the cylindrical part of the inner hub member to supply hydraulic fluid for lubrication to the friction plates.

* * * * *